United States Patent
Nakao (10) Patent No.: US 9,462,157 B2
(45) Date of Patent: Oct. 4, 2016

(54) IMAGE FORMING APPARATUS COMMUNICABLE WITH AT LEAST ONE REGISTERED MOBILE TERMINAL REGISTERED IN ADVANCE

(71) Applicant: KYOCERA Document Solutions Inc., Osaka (JP)

(72) Inventor: Masahiro Nakao, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 14/567,201

(22) Filed: Dec. 11, 2014

(65) Prior Publication Data
US 2015/0189125 A1    Jul. 2, 2015

(30) Foreign Application Priority Data
Dec. 26, 2013 (JP) ................... 2013-268238

(51) Int. Cl.
| | | |
|---|---|---|
| *H04N 1/44* | (2006.01) | |
| *H04N 1/00* | (2006.01) | |
| *H04N 1/32* | (2006.01) | |
| *H04N 1/327* | (2006.01) | |

(52) U.S. Cl.
CPC ........ *H04N 1/4433* (2013.01); *H04N 1/00307* (2013.01); *H04N 1/00925* (2013.01); *H04N 1/32507* (2013.01); *H04N 1/32561* (2013.01); *H04N 1/32765* (2013.01); *H04N 2201/0075* (2013.01); *H04N 2201/0094* (2013.01)

(58) Field of Classification Search
CPC .................................................... H04N 1/4433
USPC ..................... 358/1.14, 1.13, 1.15
See application file for complete search history.

(56) References Cited

U.S. PATENT DOCUMENTS

| | | | | |
|---|---|---|---|---|
| 2010/0093278 A1* | 4/2010 | Abel | .................... | H04B 5/0031 455/41.1 |
| 2011/0185183 A1* | 7/2011 | Yamamoto | .............. | G06F 21/33 713/182 |
| 2011/0292445 A1* | 12/2011 | Kato | ........................... | 358/1.15 |
| 2013/0250354 A1* | 9/2013 | Kato et al. | .................... | 358/1.15 |
| 2013/0257713 A1* | 10/2013 | Yamada | .................... | G06F 3/01 345/156 |
| 2015/0092223 A1* | 4/2015 | Ohara | .................. | H04N 1/4433 358/1.14 |

FOREIGN PATENT DOCUMENTS

JP    2008-193507 A    8/2008

* cited by examiner

*Primary Examiner* — Jacky X Zheng
(74) *Attorney, Agent, or Firm* — Studebaker & Brackett PC (57) ABSTRACT

In an operation panel of an image forming apparatus, a display section that displays an operation status and a near field communication section that obtains an operation instruction from a registered terminal by near field communication are arranged. In the image forming system, the registered terminal functions as an operation section of the image forming apparatus.

8 Claims, 7 Drawing Sheets

IMAGE FORMING APPARATUS COMMUNICABLE WITH AT LEAST ONE REGISTERED MOBILE TERMINAL REGISTERED IN ADVANCE

INCORPORATION BY REFERENCE

The present application claims priority under 35 U.S.C. §119 to Japanese Patent Application No. 2013-268238, filed Dec. 26, 2013. The contents of this application are incorporated herein by reference in their entirety.

BACKGROUND

The present disclosure relates to image forming apparatuses and image forming systems.

Traditional image forming apparatuses such as multifunction printers (MFPs) have been known that have a function of preventing illicit use in case of a robbery, for example, being taken out from the office. For example, an image forming apparatus has been known that includes an operation section removable from the main body of the image forming apparatus and is limited in available functions when the operation section is removed. Even when the image forming apparatus is taken out illicitly, limitation is imposed on the available functions of the main body of the image forming apparatus as long as the operation section is removed.

SUMMARY

An image forming apparatus according to one aspect of the present disclosure is an image forming apparatus of which operation is controlled according to an operation instruction from a registered terminal that is a mobile terminal registered in advance. The image forming apparatus includes a storage section, an apparatus wireless communication section used for connection to a wireless communication network, an apparatus control section, and an instruction obtaining section. The storage section is configured to store inherent data of the registered terminal. The apparatus control section is configured to obtain inherent data from a mobile terminal of interest communicable with the image forming apparatus through the wireless communication network. The apparatus control section determines whether or not the mobile terminal of interest is the registered terminal based on whether or not the obtained inherent data matches with the inherent data stored in the storage section. The device control section allows, when the mobile terminal of interest is determined as the registered terminal, the mobile terminal of interest to display a setting screen through which a user is allowed to set the operation instruction. The instruction obtaining section is configured to obtain the operation instruction set through the setting screen from the registered terminal.

An image forming system according to another aspect of the present disclosure includes: a registered terminal that is a mobile terminal registered in advance; and an image forming apparatus of which operation is controlled according to an operation instruction from the registered terminal. The image forming apparatus includes a storage section, an apparatus wireless communication section used for connection to a wireless communication network, an apparatus control section, and an instruction obtaining section. The storage section is configured to store inherent data of the registered terminal. The apparatus control section obtains inherent data from a mobile terminal of interest communicable with the image forming apparatus through the wireless communication network. The apparatus control section determines whether or not the mobile terminal of interest is the registered terminal based on whether or not the obtained inherent data matches with the inherent data stored in the storage section. The apparatus control section allows, when the mobile terminal of interest is determined as the registered terminal, the mobile terminal of interest to display a setting screen through which a user is allowed to set the operation instruction. The instruction obtaining section is configured to obtain the operation instruction set through the setting screen from the registered terminal. The registered terminal includes a display section, a terminal wireless communication section used for connection to the wireless communication network, a terminal control section, and an instruction transmitting section. The terminal control section is configured to transmit inherent data to the image forming apparatus through the wireless communication network. The terminal control section is also configured to cause the display section to display the setting screen according to an instruction from the image forming apparatus. The instruction transmitting section is configured to transmit the operation instruction set through the setting screen to the image forming apparatus.

DETAILED DESCRIPTION

First of all, a configuration of an image forming system according to the present embodiment will be described with reference to FIGS. 1A and 1B.

The image forming system according to the present embodiment includes at least one registered terminal as a mobile terminal 3 registered in advance and an image forming apparatus 1 of which operation is controlled according to operation instructions from the registered terminal. The image forming apparatus 1 is connected to one or more mobile terminals 3 communicatively through a wireless communication network 5 such as Wi-Fi (registered Japanese trademark) or the like. In addition, the image forming apparatus 1 is connected to the registered terminal communicatively through a near field communication channel 6 for near field communication (NFC).

Figure 1A:
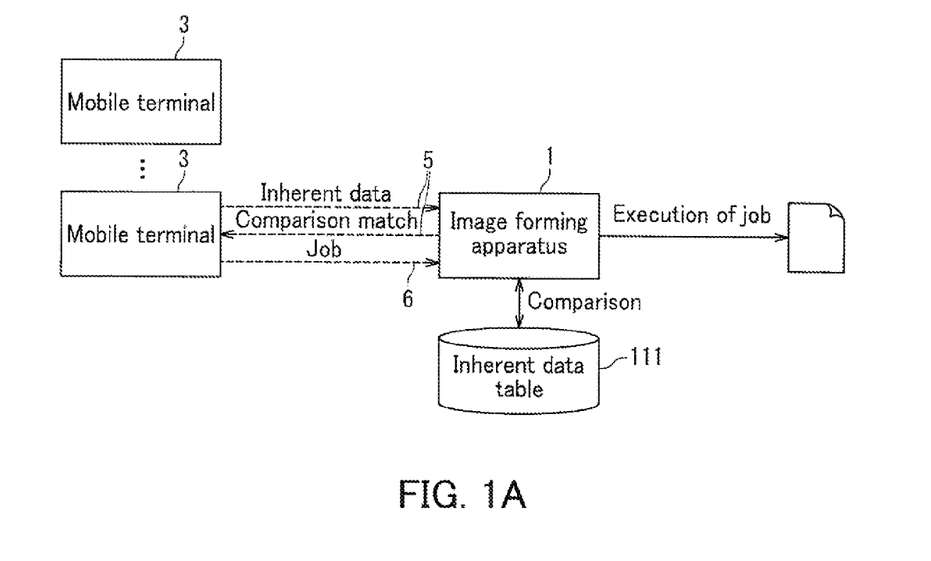
FIG. 1A is a schematic illustration showing the first configuration example of an image forming system according to an embodiment.

FIG. 1A shows a configuration example of the image forming system where the registered terminal inputs a job to the image forming apparatus 1. In the image forming system according to the present embodiment, each registered terminal functions as an operation section of the image forming apparatus 1. The functions of the image forming apparatus 1 from which its operation section is removed or the functions thereof that are available through the operation section are limited. Thus, even if the image forming apparatus 1 would be stolen, all or some of the functions of the image forming apparatus 1 could be prevented from illicit use.

The image forming apparatus 1 includes a storage section 11 (see FIG. 2) that stores inherent data of each registered terminal. In the present embodiment, the inherent data of each registered terminal is registered in an inherent data table 111 stored in the storage section 11. The image forming apparatus 1 obtains inherent data from a mobile terminal 3 of interest that is communicable through the wireless communication network 5. Then, the image forming apparatus 1 compares the obtained inherent data with the inherent data stored in the storage section 11. The image forming apparatus 1 transmits to the mobile terminal 3 of interest a comparison result, that is, data indicative of whether the obtained inherent data matches with the inherent data stored in the storage section 11 (comparison match) or not (comparison mismatch).

Upon a comparison match, the mobile terminal 3 of interest is defined as a registered terminal. In such a situation, the image forming apparatus 1 causes the mobile terminal 3 of interest to display a job setting screen 70 (see FIG. 6A). The job setting screen 70 herein is a screen that allows a user to set an operation instruction to the image forming apparatus 1, in other words, a screen that allows a user to set a job that is to be input to the image forming apparatus 1. The mobile terminal 3 of interest receives a job setting from the user through the job setting screen 70. When the mobile terminal 3 of interest that has received the job setting is held up over the image forming apparatus 1, job data (operation instruction) indicative of the job set through the job setting screen 70 is transmitted to the image forming apparatus 1 through the near field communication channel 6. The image forming apparatus 1 executes the job indicated in the received job data.

Figure 1B:
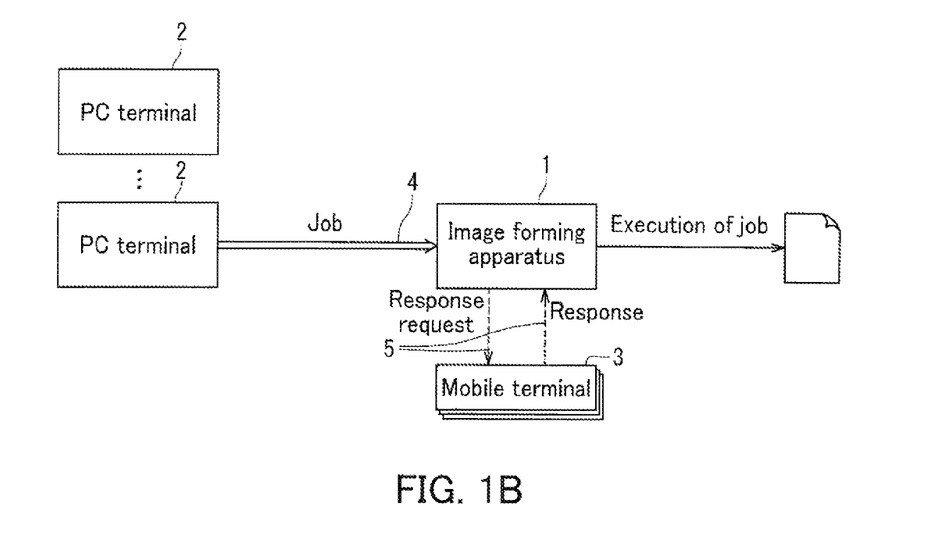
FIG. 1B is a schematic illustration showing the second configuration example of the image forming system according to the embodiment.

In general, at least one personal computer (PC) terminal 2 (computer terminals) are connected to the image forming apparatus 1 through a cable communication network 4 such as a local area network (LAN) or the like, as shown in FIG. 1B. Upon receipt of a job such as a print job from the PC terminal 2, the image forming apparatus 1 executed the received job. Accordingly, when the image forming apparatus 1 with no operation section is stolen, connection of the PC terminal 2 to the image forming apparatus 1 enables the image forming apparatus 1 to be usable through the PC terminal 2.

In view of the foregoing, when the image forming apparatus 1 receives a job from the PC terminal 2 through the cable communication network 4, the image forming system in the present embodiment confirms whether or not communication with any registered terminal is available for confirmation as to whether or not the image forming apparatus 1 is taken out from the office. Specifically, upon obtainment of a job from the PC terminal 2 through the cable communication network 4, the image forming apparatus 1 transmits a response request to one or more mobile terminals 3 through the wireless communication network 5. Once the image forming apparatus 1 receives a response from any registered terminal out of the mobile terminals 3, it is determined that the image forming apparatus 1 is not stolen, and the image forming apparatus 1 executes the job obtained from the PC terminal 2.

Figure 2:
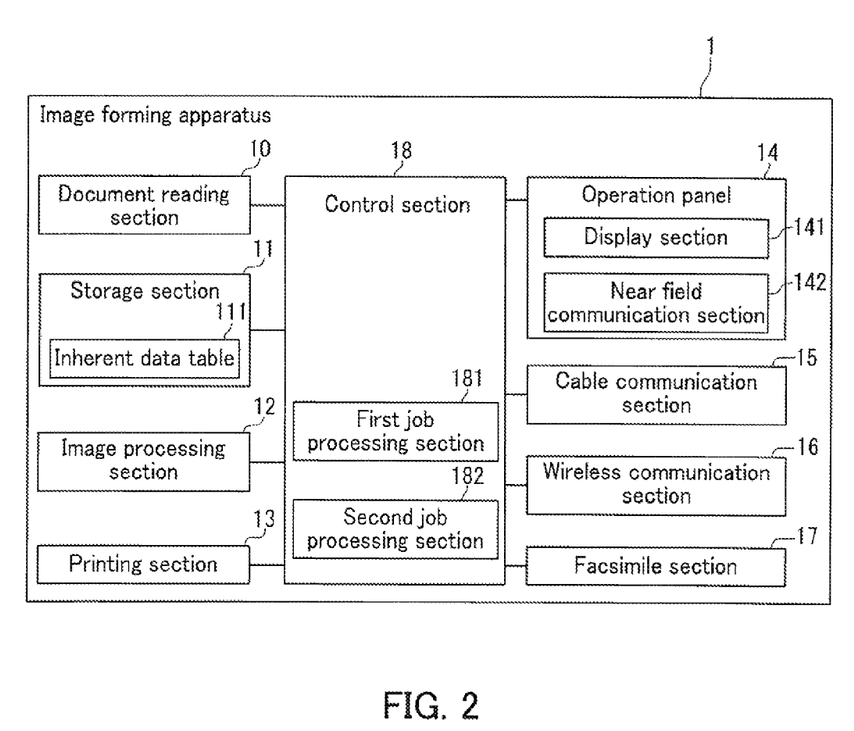
FIG. 2 is a schematic illustration showing an example of the configuration of an image forming apparatus according to the embodiment.

The configuration of the image forming apparatus 1 will be described below with reference to FIG. 2. The image forming apparatus 1 may be a MFP, for example, and includes a document reading section 10, the storage section 11, an image processing section 12, a printing section 13, an operation panel 14, a cable communication section 15, a wireless communication section 16 (apparatus wireless communication section), a facsimile section 17, and a control section 18 (apparatus control section).

The document reading section 10 is a scanner that reads the image of an original document. The document reading section 10 irradiates with light an original document fed from a document feeder (not shown) or an original document placed on a platen glass (not shown) by a user, and receives light reflected therefrom to read the image of the original document.

The storage section 11 may be a semiconductor memory or a hard disk drive (HDD), for example. The storage section 11 stores image data that the document reading section 10 generates by reading the image of an original document, image data that the cable communication section 15, a near filed communication section 142, and the facsimile section 17 receive, etc.

The storage section 11 additionally stores the inherent data of each registered terminal, for example, their ID numbers. In the present embodiment, the inherent data of each registered terminal is registered in the inherent data table 111 that the storage section 11 stores. An administrator of the image forming apparatus 1 can log in the image forming apparatus 1 using the administrator ID through the cable communication network 4 and register the inherent data of a registered terminal to the inherent data table 111. Each inherent data of the one or more registered terminals is registered in the inherent data table 111.

The image processing section 12 performs predetermined image processing on image data. The image processing section 12 perform image improving processing such as density adjustment, grayscale adjustment, etc., and zooming processing, for example.

The printing section 13 prints an image based on image data stored in the storage section 11. Specifically, the printing section 13 forms a latent image on the surface of a photosensitive drum based on image data read out from the storage section 11. The printing section 13 develops the formed latent image with toner to form a toner image on the surface of the photosensitive drum. The printing section 13 then transfers the toner image from the photosensitive drum to recording paper and fixes the transferred image to the recording paper. Thereafter, the printing section 13 ejects the recording paper to which the toner image has been fixed from the image forming apparatus 1.

Figure 3:
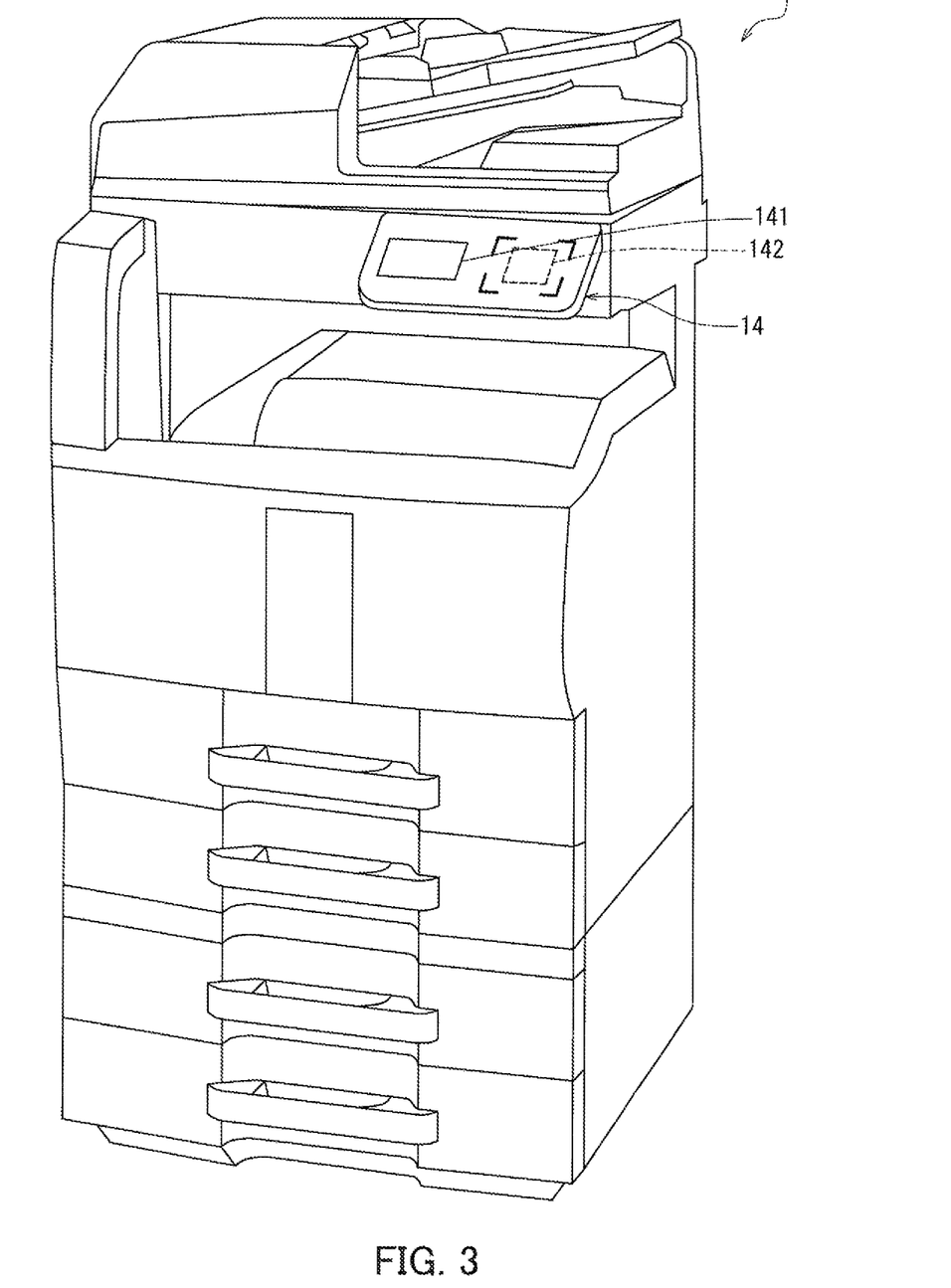
FIG. 3 is a perspective view showing an example of the image forming apparatus according to the embodiment.

The operation panel 14 includes a display section 141 and the near field communication section 142 (instruction obtaining section). The display section 141 and the near filed communication section 142 are arranged side by side on the operation panel 14, for example (see FIG. 3). The display section 141 may be a liquid crystal display, for example. The display section 141 displays information indicative of the operation status of the image forming apparatus 1 including error information indicative of a jam or the like, information indicative of a job executing state, etc. The display section 141 may be simple and may be, for example, a two-line liquid crystal display.

Using radio frequency identification (RFID) technology, the near field communication section 142 transmits and receives various types of data to and from each registered terminal when the registered terminal comes near to the near field communication section 142. When a registered terminal is held up over the near field communication section 142, the near filed communication section 142 obtains job data (an operation instruction) from the registered terminal by performing near field communication with the registered terminal, in other words, through the near filed communication channel 6. The near filed communication section 142 may be provided on any part of the image forming apparatus 1 other than on the operation panel 14.

The cable communication section 15 is used for connection to the cable communication network 4. For example, the cable communication section 15 transmits and receives various types of data to and from each PC terminal 2 through the cable communication network 4. For example, the cable communication section 15 obtains job data from each PC terminal 2.

The wireless communication section 16 is used for connection to the wireless communication network 5. The wireless communication section 16 transmits and receives various types of data to and from each mobile terminal 3 through the wireless communication network 5. For example, the wireless communication section 16 confirms whether or not the image forming apparatus 1 is connectable to any registered terminal. Further, the wireless communication section 16 receives the inherent data from each mobile terminal 3 and transmits a result (comparison results) obtained by comparison based on the received inherent data to the mobile terminal 3. Note that the communicable range of the wireless communication section 16 is set within the office in which the image forming apparatus 1 is installed, for example.

The facsimile section 17 includes a modem and has facsimile transmitting and receiving functions. For example, the facsimile section 17 generates facsimile signals based on image data that the document reading section 10 reads or image data that the storage section 11 stores and transmits the generated facsimile signals through a public network. Further, the facsimile section 17 receives facsimile signals through the public network.

The control section 18 is connected to each of the document reading section 10, the storage section 11, the image processing section 12, the printing section 13, the operation panel 14, the cable communication section 15, the wireless communication section 16, and the facsimile section 17. The control section 18 is an information processing section such as a microcomputer including a read only memory (ROM) and a random access memory (RAM). The ROM stores control programs for controlling the operation of the image forming apparatus 1. The control section 18 loads the control programs stored in the ROM on the RAM and executes them for controlling the entire image forming apparatus 1. For example, the control section 18 executes the control programs to function as a first job processing section 181 and a second job processing section 182. The first job processing section 181 processes a job obtained from each PC terminal 2. The second job processing section 182 processes a job obtained from each registered terminal. The first and second job processing sections 181 and 182 will be described later in detail.

Figure 4:
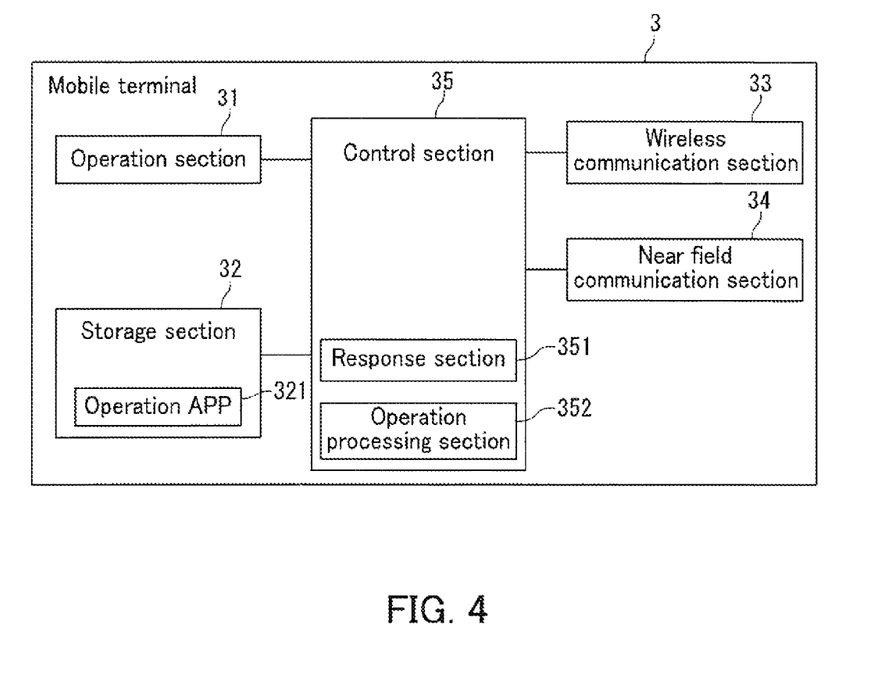
FIG. 4 is a schematic illustration showing an example of the configuration of a mobile terminal according to the embodiment.

As shown in FIG. 4, each mobile terminal 3 may be a portable device such as a smart phone, a mobile phone, a tablet terminal, a personal digital assistant (PDA), or the like. The mobile terminal 3 includes an operation section 31, a storage section 32, a wireless communication section 33 (terminal wireless communication section), a near field communication section 34 (instruction transmitting section), and a control section 35 (terminal control section). Note that each mobile terminal 3 as a registered terminal and each mobile terminal 3 as a non-registered terminal in the present embodiment has the same configuration shown in FIG. 4, but may have different configurations. For example, any mobile terminal 3 as a non-registered terminal may not include the near field communication section 34.

The operation section 31 is a user interface including a display section that displays various information and various operation keys. The operation section 31 may be a touch panel including a display panel on which a transparent pressure sensor is provided.

The storage section 32 may be a semiconductor memory or a hard disk drive (HDD), for example. The storage section 32 stores an operation application (APP) 321. The operation APP 321 is an application program for remote control on the image forming apparatus 1 and is installed in a mobile terminal 3. A user can download the operation APP 321 from a server on the Internet for installation in a mobile terminal 3.

The wireless communication section 33 is used for connection to the wireless communication network 5. The wireless communication section 33 transmits and receives various types of data to and from the image forming apparatus 1 through the wireless communication network 5. For example, the wireless communication section 33 transmits inherent data to the image forming apparatus 1 and responds to a response request from the image forming apparatus 1.

The near field communication section 34 performs near field communication with a target device by radio frequency identification (RFID) technology. In the present embodiment, when a mobile terminal 3 as a registered terminal is held up over the near field communication section 142 of the image forming apparatus 1, the near field communication section 34 of the mobile terminal 3 transmits job data (an operation instruction) to the image forming apparatus 1 through the near field communication channel 6.

The control section 35 is connected to each of the operation section 31, the storage section 32, the wireless communication section 33, and the near field communication section 34. The control section 35 controls overall operation of the mobile terminal 3 in response to various instructions input through the operation section 31. The control section 35 is an information processing section such as a microcomputer including a ROM and a RAM. The ROM stores control programs for controlling the operation of the mobile terminal 3. The control section 35 loads the control programs or the application programs stored in the ROM or the storage section 32 on the RAM and executes them to perform overall control on the mobile terminal 3. For example, the control section 35 executes the operation APP 321 based on an instruction input through the operation section 31 to function as a response section 351 and an operation processing section 352.

When the response section 351 of a mobile terminal 3 as a registered terminal receives a response request, which will be described later in detail, from the image forming apparatus 1 through the wireless communication network 5, it transmits a response to the image forming apparatus 1 through the wireless communication network 5. Note that the response section 351 is operable in its background once the operation APP 321 is installed, for example.

The operation processing section 352 performs various processing in parallel to communication with the image forming apparatus 1. The operation processing section 352 transmits a job that utilizes any of various functions of the image forming apparatus 1, for example, a print function, a copy function, a fax function, or a scan function to the image forming apparatus 1 using the near field communication section 34.

Figure 5:
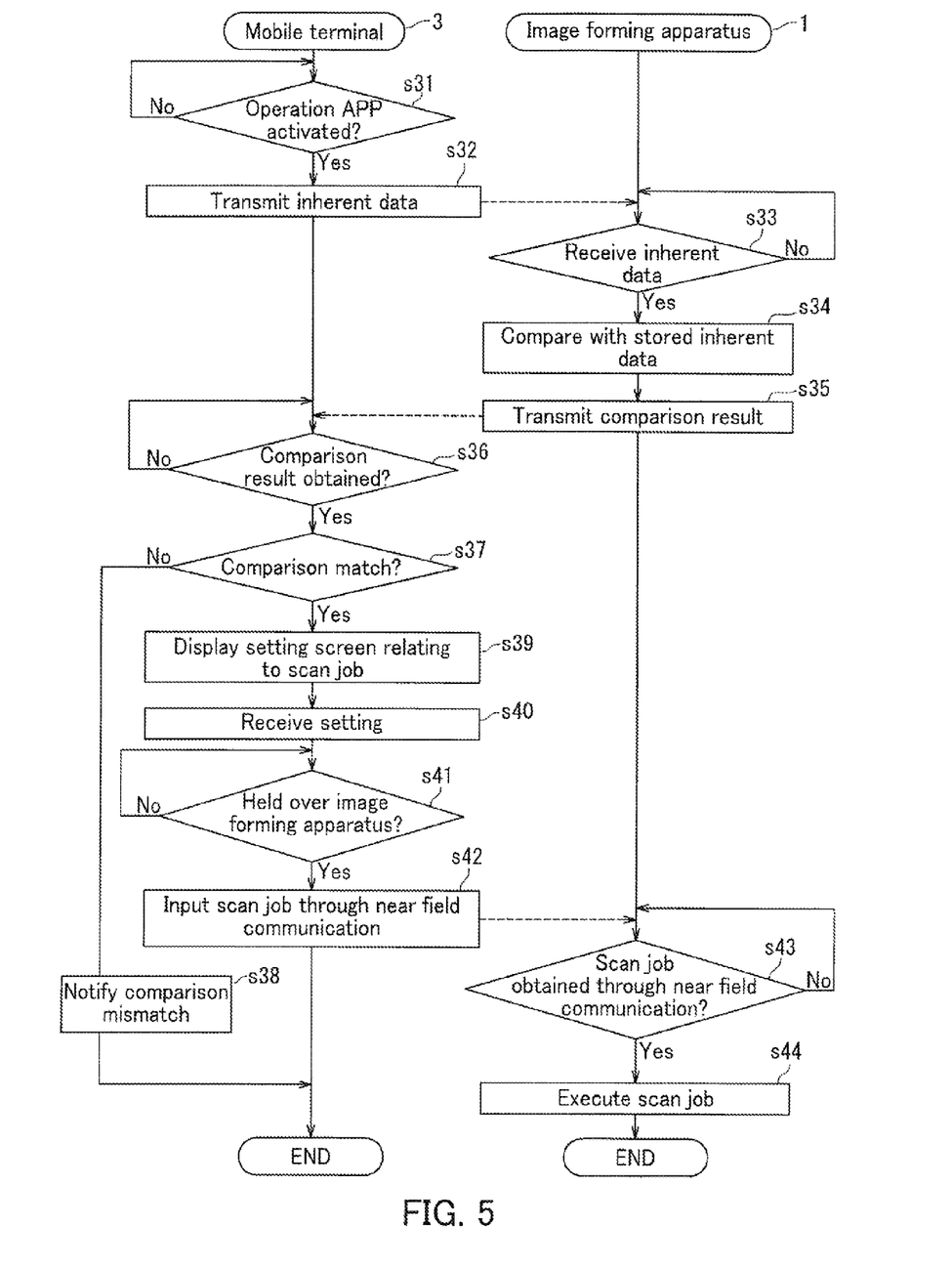
FIG. 5 is a flowchart depicting the first processing that the image forming system performs according to the embodiment.
Figure 6A:
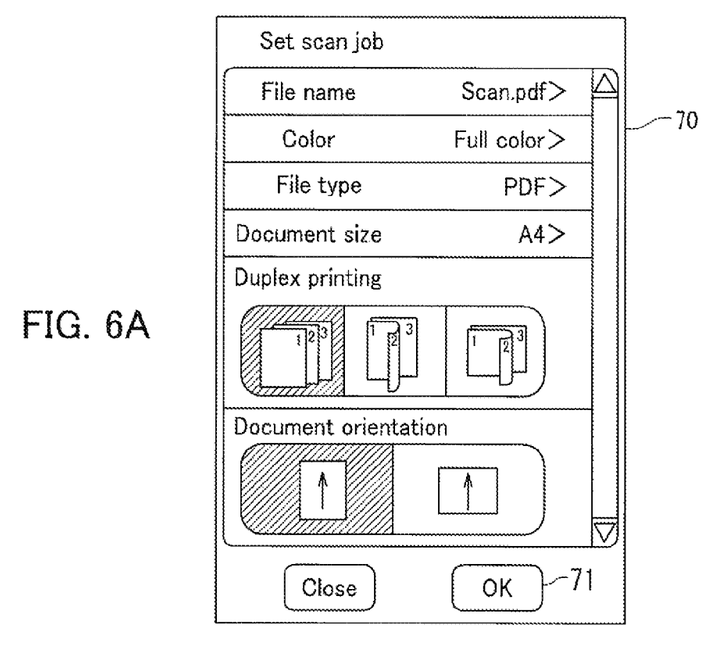
FIG. 6A is a schematic illustration showing an example of the configuration of a job setting screen according to the embodiment.
Figure 6B:
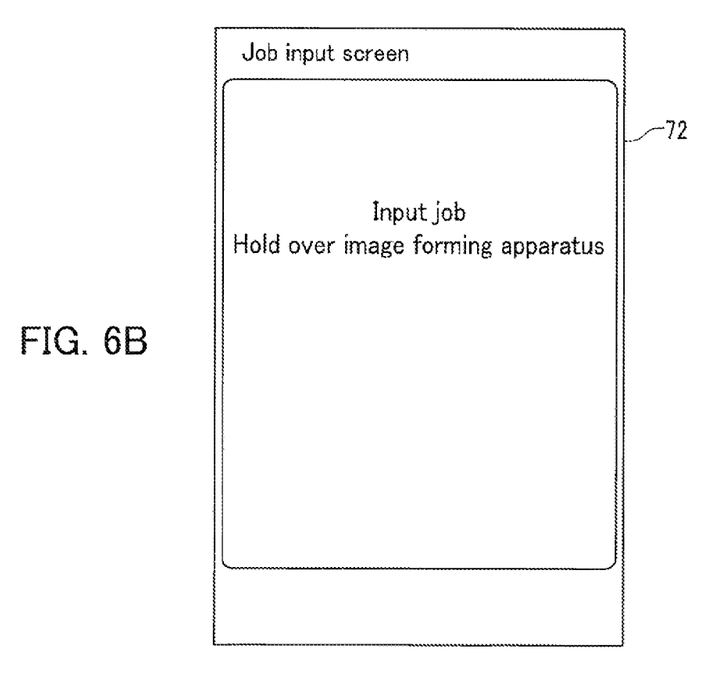
FIG. 6B is a schematic illustration showing an example of the configuration of a job input screen according to the embodiment.
Figure 7:
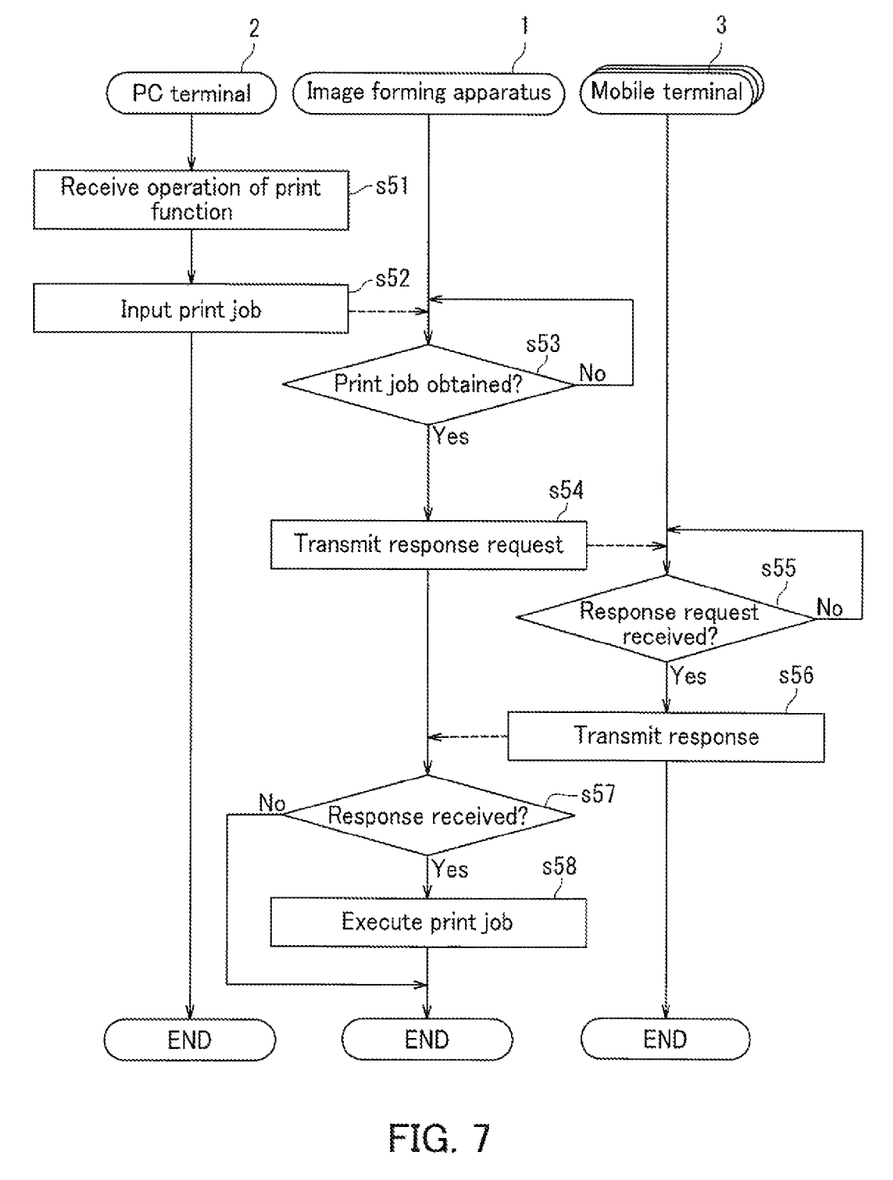
FIG. 7 is a flowchart depicting the second processing that the image forming system performs according to the embodiment.

With reference to FIGS. 5-7, processing (first and second processing) will be described next that the image forming system performs according to the present embodiment.

FIG. 5 is a flowchart depicting the first processing, specifically, processing in the image forming system in response to a job input from a registered terminal. Herein, a case where a scan job that utilizes the scan function of the image forming apparatus 1 is input from a registered terminal is described as an example.

The mobile terminal 3 waits until activation of the operation APP 321 (No at Step s31). Upon activation of the operation APP 321 (Yes at Step s31), the operation processing section 352 of the mobile terminal 3 controls the wireless communication section 33 to transmit the inherent data of its own to the image forming apparatus 1 through the wireless communication network 5 (Step s32).

The second job processing section 182 of the image forming apparatus 1 waits until receipt of the inherent data through the wireless communication network 5 (No at Step s33). Upon receipt of the inherent data (Yes at Step s33), the second job processing section 182 references the inherent data table 111 to compare the received inherent data with the inherent data registered in the inherent data table 111 (Step s34). Then, the second job processing section 182 controls the wireless communication section 16 to transmit the comparison result to the mobile terminal 3 that is a transmitter of the inherent data through the wireless communication network 5 (Step s35).

The operation processing section 352 of the mobile terminal 3 waits until receipt of the comparison result (No at Step s36). Upon receipt of the comparison result (Yes at Step s36), the operation processing section 352 determines whether or not the comparison result indicates a comparison match (Step s37). When the comparison result indicates no match, that is, a comparison mismatch (No at Step s37), the operation processing section 352 notifies the user of the comparison mismatch (step s38). Then, the processing is ended.

By contrast, when the comparison result indicates a comparison match, in other words, when the mobile terminal 3 is a registered terminal (Yes at Step s37), the operation processing section 352 is enabled to display of the job setting screen 70. The operation processing section 352 causes the operation section 31 to display the job setting screen 70 relating to, for example, a scan job (Step s39). The operation processing section 352 receives a scan job setting from the user through the job setting screen 70 (Step s40).

As shown in FIG. 6A, the operation processing section 352 is capable of receiving from a user a setting of a file name, a color, a file type, a document size, duplex printing, a document direction, etc. through the job setting screen 70 relating to the scan job. When an OK button 71 is clicked, a scan job based on the content of the setting set through the setting screen is generated. Then, a job input screen 72 as shown in FIG. 6B is displayed in the operation section 31. The user sets a to-be-scanned original document on a document table (not shown) of the image forming apparatus 1 and holds up the mobile terminal 3 displaying the job input screen 72 over the operation panel 14, specifically, the near field communication section 142 of the image forming apparatus 1.

The operation processing section 352 of the mobile terminal 3 waits until the mobile terminal 3 is held up over the operation panel 14 (No at Step s41). When the mobile terminal 3 is held up over the operation panel 14 (Yes at s41), the near field communication section 34 is controlled to transmit job data (an operation instruction) indicative of the scan job set through the job setting screen 70 to the image forming apparatus 1 through the near field communication channel 6 (Step s42).

The second job processing section 182 of the image forming apparatus 1 waits until receipt of the job data through the near field communication channel 6 (No at Step s43). Upon obtainment of the job data through the near field communication channel 6 (Yes at Step s43), the second job processing section 182 executes the scan job indicated in the obtained job data (Step s44). Thus, the original document set on the document table is read, and image data is generated based on the read image. Then, the second job processing section 182 terminates the processing.

FIG. 7 is a flowchart depicting the second processing, specifically, processing in the image forming system in response to a job input from a PC terminal 2. The case where a print job is input from a PC terminal 2 will be described herein as one example.

The PC terminal 2 receives from a user an operation instructing the use of the print function (Step s51). Then, the PC terminal 2 transmits a print job to the image forming apparatus 1 through the cable communication network 4 (Step s52).

The first job processing section 181 of the image forming apparatus 1 waits until obtainment of the print job from the PC terminal 2 through the cable communication network 4 (No at Step s53). Once the print job is obtained from the PC terminal 2 through the cable communication network 4 (Yes at Step s53), the first job processing section 181 controls the wireless communication section 16 to transmit a response request to one or more mobile terminals 3 through the wireless communication network 5 (Step s54). The response request may be transmitted by broadcast or may be transmitted to any specified mobile terminal 3.

The response section 351 of each registered terminal out of the one or more mobile terminals 3 waits until receipt of the response request from the image forming apparatus 1 (No at Step s55). The response section 351 of the registered terminal that has received the response request (Yes at Step s55) controls the wireless communication section 33 to transmit a response indicative of receipt of the response request to the image forming apparatus 1 through the wireless communication network 5 (step s56). Note that any registered terminals located outside the communicable range of the wireless communication network 5 connected to the image forming apparatus 1 cannot receive the response request and therefore do not respond.

After receiving the response request, the first job processing section 181 of the image forming apparatus 1 determines whether or not a response is received from any mobile terminal 3 (Step s57). If no response request is received within a predetermined time period (No at Step s57), the first job processing section 181 determines that the image forming apparatus 1 is taken out from the office and terminates the processing without execution of the job input from the PC terminal 2.

By contrast, when the response request is received from any mobile terminal 3 (Yes at Step s57), the first job processing section 181 determines that the image forming apparatus 1 is not taken out from the office and executes the job input from the PC terminal 2 (Step s58). Then, the first job processing section 181 terminates the processing.

Note that each PC terminal 2 may be connected to the image forming apparatus 1 through the wireless communication network 5. In this case, a job may be input through the wireless communication network 5.

As described above, the image forming system according to the present embodiment includes the registered terminals as the mobile terminals 3 registered in advance and the image forming apparatus 1 of which operation is controlled according to an operation instruction from any registered terminal. The image forming apparatus 1 includes the storage section 11, the wireless communication section 16, the control section 18, and the near field communication section 142. The storage section 11 stores the inherent data of each registered terminal. The wireless communication section 16 is used for connection to the wireless communication network 5. The control section 18 obtains inherent data from a mobile terminal 3 of interest that is communicable through the wireless communication network 5. The control section 18 then determines whether or not the mobile terminal 3 of interest is a registered terminal based on whether or not the obtained inherent data matches with the inherent data stored in the storage section 11. When the mobile terminal 3 of interest is determined as a registered terminal, the control section 18 then allows the mobile terminal 3 of interest to display the job setting screen 70. The near field communication section 142 obtains an operation instruction set through the job setting screen 70 from the registered terminal. The registered terminal includes the operation section 31 (display section) having a display function, the wireless communication section 33, the control section 35, and the near field communication section 34. The wireless communication section 33 is used for connection to the wireless communication network 5. The control section 35 transmits the inherent data to the image forming apparatus 1 through the wireless communication network 5. Further, the control section 35 causes the operation section 31 to display the job setting screen 70 based on an instruction from the image forming apparatus 1. The near field communication section 34 transmits an operation instruction set through the job setting screen 70 to the image forming apparatus 1.

With the above configuration, even if the main body of the image forming apparatus 1 would be taken out, a person who has taken out the apparatus 1 cannot directly operate the apparatus 1 as the operation panel 14 of the image forming apparatus 1 includes only the display section 141 and the near field communication section 142. Further, any devices other than the registered terminals are incapable of inputting any job through the near field communication channel 6. Thus, illicit use of the image forming apparatus 1 can be prevented.

Further, in response to job input from a PC terminal 2, the image forming apparatus 1 executes the job from the PC terminal 2 only when communication with any registered terminal is available through the wireless communication network 5. With the above configuration, once the main body of the image forming apparatus 1 is taken out from the office, the image forming apparatus 1 is disabled to communicate with each registered terminal. Accordingly, a person who has taken out the image forming apparatus 1 cannot operate the image forming apparatus 1 even if the apparatus 1 is connected to a PC terminal 2. Thus, illicit use of the image forming apparatus 1 can be prevented.

The present disclosure is not limited to the above embodiments and can be modified in various manners within the scope not departing from the subject matter of the present disclosure.

What is claimed is:

1. An image forming apparatus communicable with a plurality of registered mobile terminals registered in advance, comprising:
   a storage section configured to store inherent data of respective ones of the plurality of registered mobile terminals;
   an apparatus wireless communication section used for connection to a wireless communication network;
   an apparatus control section configured to control the apparatus wireless communication section and process a job obtained from a computer terminal that is different from the plurality of registered mobile terminals and that is connected to the image forming apparatus;
   an instruction obtaining section configured to obtain job data indicative of a job set through a setting screen from the respective ones of the plurality of registered mobile terminals; and
   an operation panel,
   wherein the instruction obtaining section includes a near field wireless communication section,
   the instruction obtaining section obtains the data job from a mobile terminal of interest determined as one of the plurality of registered mobile terminals through the near field wireless communication section,
   only a display section to display an operation status and the near field wireless communication section are arranged in an adjacent manner on the operation panel,
   the instruction obtaining section starts obtaining the operation instruction once it is detected that the mobile terminal of interest determined as the one of the plurality of registered mobile terminals is held up thereover,
   the apparatus wireless communication section is communicable within a range of an office in which the image forming apparatus is installed,
   when a job is obtained from the computer terminal, the apparatus wireless communication section transmits to the wireless communication network, a confirmation signal for confirming whether there are any of the plurality of registered mobile terminals within the range communicable with the wireless communication network by broadcast, and
   when the apparatus wireless communication section receives a response to the confirmation signal from any of the plurality of mobile terminals, the apparatus control section determines that the image forming apparatus is not taken out from the office and causes the image forming apparatus to execute the job obtained from the computer terminal and terminate processing,
   when the apparatus wireless communication section does not receive a response to the confirmation signal from any of the plurality of mobile terminals after transmitting the confirmation signal, the apparatus control section determines that the image forming apparatus is taken out from the office and causes the image forming apparatus to terminate the job obtained from the computer terminal without causing the image forming apparatus to execute the job.

2. An image forming apparatus according to claim 1, wherein
the job is a print job.

3. An image forming apparatus according to claim 1, wherein
the apparatus control section obtains inherent data that a mobile terminal of interest transmits at activation of operation through the wireless communication network,
the apparatus control section determines whether or not the mobile terminal of interest is any of the plurality of registered mobile terminals based on whether or not the obtained inherent data matches with the inherent data stored in the storage section, and
when the mobile terminal of interest is determined as any one of the plurality of registered mobile terminals, the apparatus control section allows the mobile terminal of interest to display a setting screen through which a user is allowed to set the job data.

4. An image forming apparatus according to claim 3, wherein
the job data pertains to execution of scan.

5. An image forming system comprising:
a plurality of registered mobile terminals registered in advance;
an image forming apparatus communicable with the plurality of registered mobile terminals; and
a computer terminal that is connected to the image forming apparatus and that is different from the one or more registered mobile terminals, wherein
the image forming apparatus includes:
a storage section configured to store inherent data of respective ones of the plurality of registered mobile terminals;
an apparatus wireless communication section used for connection to a wireless communication network;
an apparatus control section configured to control the apparatus wireless communication section and process a job obtained from the computer terminal;
an instruction obtaining section configured to obtain job data indicative of a job set through a setting screen from the respective ones of the plurality of registered mobile terminals; and
an operation panel,
the instruction obtaining section includes a near field wireless communication section,
the instruction obtaining section obtains the job data from a mobile terminal of interest determined as one of the plurality of registered mobile terminals through the near field wireless communication section,
only a display section to display an operation status and the near field wireless communication section are arranged in an adjacent manner on the operation panel,
the instruction obtaining section starts obtaining the operation instruction once it is detected that the mobile terminal of interest determined as the one of the plurality of registered mobile terminals is held up thereover,
the apparatus wireless communication section is communicable within a range of an office in which the image forming apparatus is installed,
the plurality of registered mobile terminals each include a terminal wireless communication section used for connection to the wireless communication network,
when the image forming apparatus obtains a job from the computer terminal, the apparatus wireless communication section transmits to the wireless communication network, a confirmation signal for confirming whether there are any of the plurality of registered mobile terminals within a range communicable with the wireless communication network by broadcast, and
when the apparatus wireless communication section receives a response to the confirmation signal from any of the plurality of mobile terminals, the apparatus control section determines that the image forming apparatus is not taken out from the office and causes the image forming apparatus to execute the job obtained from the computer terminal and terminate processing,
when the apparatus wireless communication section does not receive a response to the confirmation signal from any of the plurality of mobile terminals after transmitting the confirmation signal, the apparatus control section determines that the image forming apparatus is taken out from the office and causes the image forming apparatus to terminate the job obtained from the computer terminal without causing the image forming apparatus to execute the job.

6. An image forming system according to claim 5, wherein
the job is a print job.

7. An image forming system according to claim 5, wherein
the apparatus control section obtains inherent data that a mobile terminal of interest transmits at activation of operation through the wireless communication network,
the apparatus control section determines whether or not the mobile terminal of interest is any one of the plurality of registered mobile terminals based on whether or not the obtained inherent data matches with the inherent data stored in the storage section,
when the mobile terminal of interest is determined as the one of the plurality of registered mobile terminal, the apparatus control section allows the mobile terminal of interest to display a setting screen through which a user is allowed to set the job data indicative of a job,
the image forming apparatus further includes an instruction obtaining section configured to obtain the job data set through the setting screen from the plurality of registered mobile terminal, and
the plurality of registered mobile terminals each include:
a terminal display section;
a terminal control section configured to transmit inherent data to the image forming apparatus through the wireless communication network and cause the terminal display section to display the setting screen according to an instruction from the image forming apparatus; and
an instruction transmitting section configured to transmit the job data set through the setting screen to the image forming apparatus.

8. An image forming system according to claim 7, wherein
the job data pertains to execution of scan.

* * * * *